United States Patent [19]

Blakely et al.

[11] Patent Number: 4,540,259

[45] Date of Patent: Sep. 10, 1985

[54] IDENTIFICATION CARD CAMERA SYSTEM AND METHOD

[75] Inventors: Linda L. Blakely, Belmont; Myron A. Seiden, Needham, both of Mass.

[73] Assignee: Polaroid Corporation, Cambridge, Mass.

[21] Appl. No.: 538,374

[22] Filed: Oct. 3, 1983

[51] Int. Cl.[3] .................... G03B 17/24; G03B 17/48; G03B 41/00

[52] U.S. Cl. .................... 354/109; 354/119; 354/120

[58] Field of Search .................... 354/105–109, 354/118–120; 352/46, 55; 355/39, 40; 378/162–166; 358/244; 346/110 R

[56] References Cited

U.S. PATENT DOCUMENTS

| | | | |
|---|---|---|---|
| 3,587,419 | 6/1971 | Blazek et al. | 354/109 X |
| 3,631,773 | 1/1972 | Moodie | 354/108 |
| 3,696,716 | 10/1972 | Pasieka | 354/109 |
| 3,796,485 | 3/1974 | Seiden | 354/118 X |
| 3,838,435 | 9/1974 | Mepham | 354/109 |
| 3,928,863 | 12/1975 | Stewart et al. | 354/109 |
| 4,191,962 | 3/1980 | Sramek | 354/105 X |
| 4,248,510 | 2/1981 | Baker et al. | 354/109 |
| 4,465,364 | 8/1984 | Krobel et al. | 354/109 X |

*Primary Examiner*—William B. Perkey
*Attorney, Agent, or Firm*—David R. Thornton

[57] ABSTRACT

An identification card camera system including a data carrier and an arrangement for reproducing on an identification card a portion of the data from the data carrier and the image of a subject, and for reproducing on a photographic record the portion of the data reproduced on the identification card, as well as additional data from the data carrier and an image of the subject. A blip is produced on the photographic record in association with each subject and related data. Additional blips representing the beginning and end of subjects and related data recorded during a supervisory operational period are produced on the photographic record.

23 Claims, 28 Drawing Figures

FIG. 1
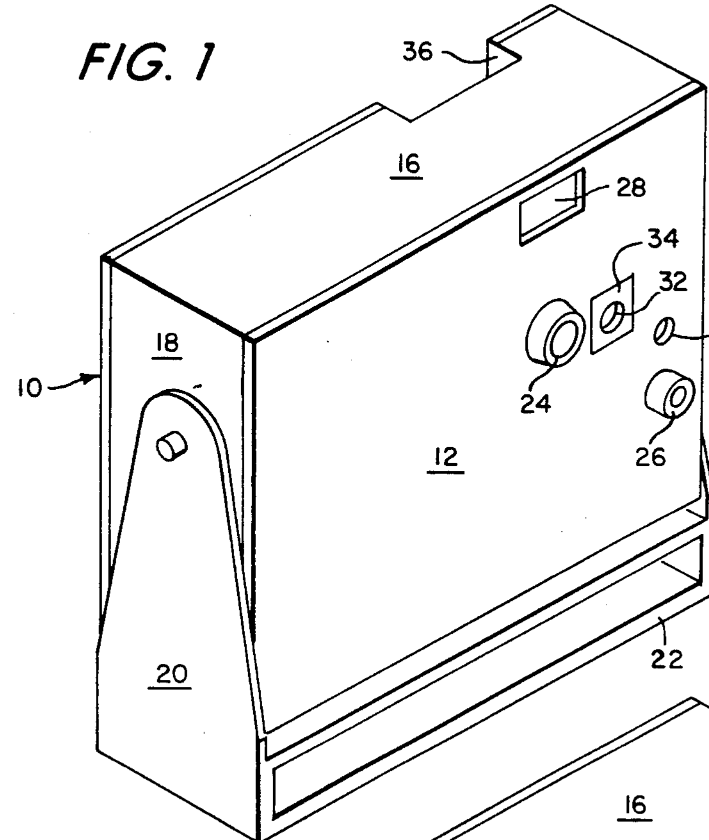
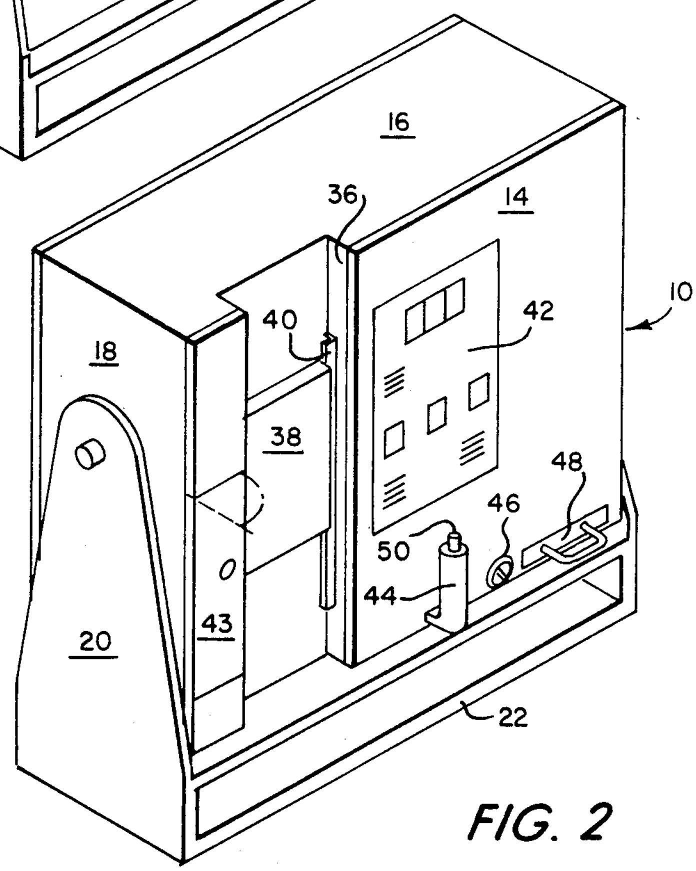
FIG. 2

FIG. 15
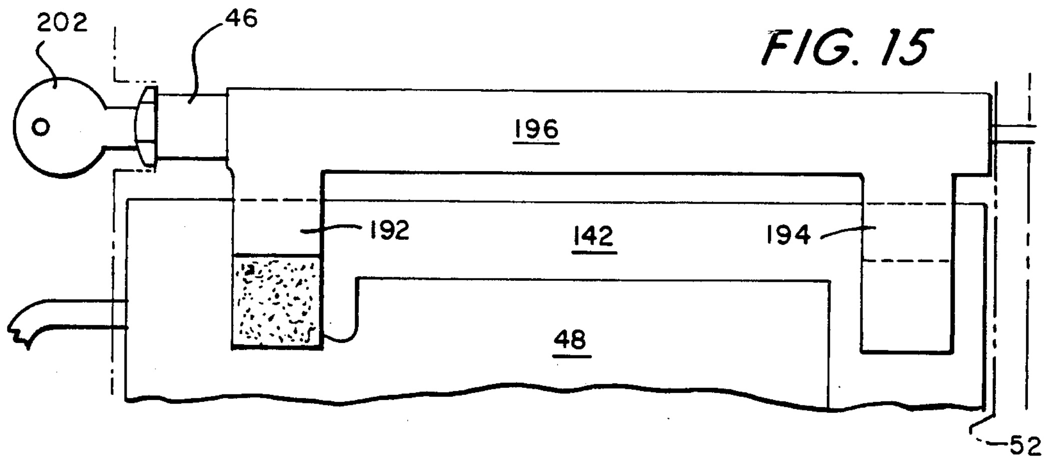
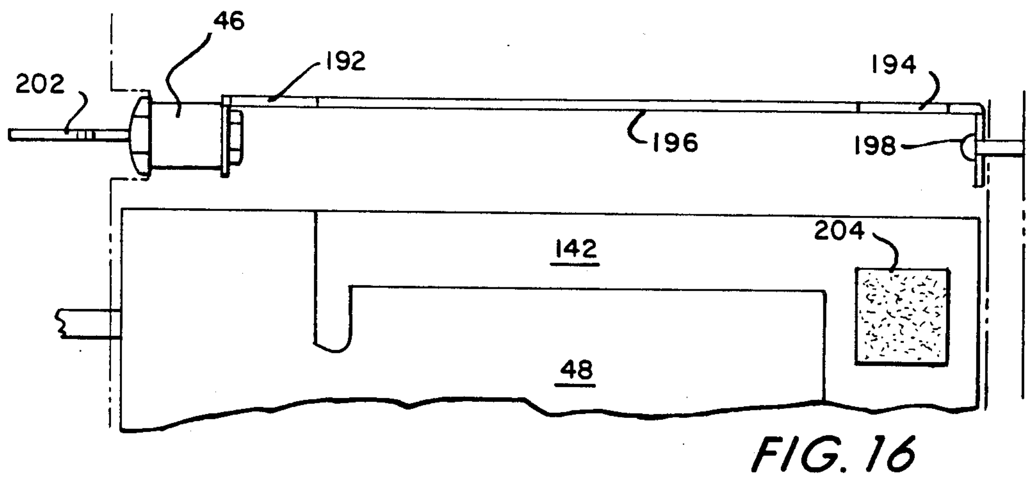
FIG. 16
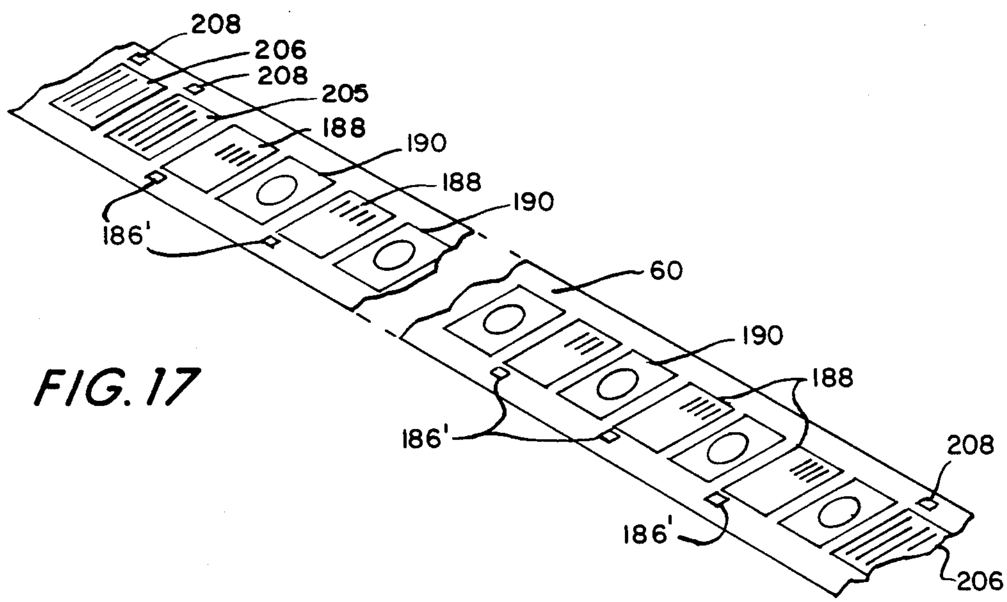
FIG. 17

IDENTIFICATION CARD CAMERA SYSTEM AND METHOD

BACKGROUND OF THE INVENTION

1. Field of the Invention

This invention relates to composite subject/data identification cards. More particularly, it concerns a method and system of apparatus for providing such cards together with a film strip record of not only all information recorded on each card, but additional subject identifying information and data in a format which can be readily correlated to each identification card.

2. Description of the Prior Art

Camera systems for providing identification cards containing a photograph of a subject to whom the card applies, as well as other printed or graphic data, are well known in the art. Systems currently used extensively by numerous private and governmental organizations are exemplified by the disclosures of U.S. Pat. Nos. 3,631,773; 3,641,886; 3,678,818; 3,683,764; 3,696,716; 3,726,198 and 3,762,292. Such systems typically employ a dual optical path for presenting to the film plane of an instant camera, for example, light images representing both a portrait of the subject to be identified by the identification card as well as printed or graphic data applicable to the subject and/or to the organization issuing the card. Areas of the card reserved for the respective subject and data images are delineated by a masking arrangement of orthogonally polarized light paths in combination with a polarizing plate at the film plane of the camera to which both the subject and data images are presented. The polarizing plate may carry indicia symbolizing the authentication of the card issuing organization such as a validating signature or seal, either of which may be arranged to partially overlie both the subject and data images recorded on the ultimate identification card.

The administration of central file records by which the issuance of each identification card as well as retention of information pertaining to the subject of each card is an important adjunct to the use of identification card camera systems. While the data carrier, usually in the form of a file card, which is used in the production of each identification card serves as a file record, in itself, it has been recognized in the art that the data card is incomplete without inclusion also of a portrait of the subject to whom it applies. To accommodate this need, identification card camera systems have been developed to include a record filmstrip on which all information presented on the composite subject/data format of each successive identification card is recorded in successive frames on the record filmstrip. The disclosure of U.S. Pat. No. 4,248,510 is exemplary of a camera system employing such a record filmstrip. Other similar camera systems have been proposed and in each such system, the record filmstrip serves as a central file record by which the authenticity of the originally issued composite/data identification card can be verified.

In prior identification card camera systems, direct facsimile identification of the subject to whom the card applies has been restricted to the photograph of the subject and a facsimile of the subject's written signature. Many organizations require additional facsimile identification such as a fingerprint or the like. Given the size of an identification card which has evolved through tradition as well as for ease of carrying and handling, it is difficult if not impossible to reproduce photographically the combination of data, portraiture and a viable fingerprint on the format of an identification card. The resolution required for a useful photographic reproduction of a fingerprint is, in itself, severely restrictive from a standpoint of image size reduction. In prior systems, where the complete information presented on the composite subject/data identification card is recorded on a record filmstrip, the reproduction of such auxiliary physical identifying data has been precluded out of the limited space available on the identification card.

Another problem which has been presented in the use and administration of identification card camera systems is the lack of security associated with the multiples of personnel in a given organization having access to the camera system. In the systems which are presently available, for example, it is possible for a dishonest employee in an organization to falsify the information on a data card and provide to a given subject an identification card which otherwise cannot be detected as less than authentic. There is a need, therefore, not only for an identification card camera system which may accommodate additional forms of physical identifying data for a given subject as well as a system which affords increased security against unauthorized operation.

SUMMARY OF THE INVENTION

In accordance with the present invention, a photographic identification card system and method is provided in which a filmstrip record of each identification card produced is arranged to provide adjacent full-frame images not only of the subject to whom the card is issued but also of a complete data card or carrier inclusive of both card data for reproduction on the composite identification card and of record data applicable to the subject and retained only on the filmstrip record. As a result, complete physical identifying facsimiles such as a portrait, signature and fingerprint may be retained on the filmstrip record and easily correlated to each issued identification card.

The system for practicing the invention is embodied in a single compact and tamper-free housing enclosing an identification card camera, a photorecord camera, a card tray for supporting a data carrier including card data and record data applicable to a given subject, and an optical system by which an image of card data on the carrier may be presented to the identification camera and by which the combined card data and record data may be presented to the record camera. The housing also encloses a control system by which both cameras may additionally record an image of the subject for the identification card. Operation of both cameras is completely automated for exposure of the respective films contained therein to the data carrier and such operation is initiated by the insertion of the data carrier into the housing by an operator. Photographs of the subject, both by the record camera and by the identification camera are effected simultaneously by manual control of the operator upon being given enunciated information by the system. Also, the system includes a provision for initialization by a supervisor as well as a verification of all supervisor actions on the record filmstrip.

A principal object of the present invention is, therefore, the provision of an improved photographic identification card system which may accommodate increased facsimile identification applicable to a subject and which incorporates an enhanced measure of security against fraudulent use. Other objects and further scope of applicability will become apparent from the detailed description to follow, taken in conjunction with the accompanying drawings wherein like parts are designated by like reference numerals.

BRIEF DESCRIPTION OF THE DRAWINGS

FIG. 1 is a perspective view illustrating the front exterior of a housing containing the system of the present invention;

FIG. 2 is a similar perspective view illustrating the rear exterior of the housing;

FIG. 15 is a fragmentary plan view illustrating a portion of the apparatus shown in FIG. 7 in one condition of operation;

FIG. 16 is a similar fragmentary plan view but illustrating the components shown in FIG. 15 in a different operative position;

FIG. 17 is a fragmentary perspective view illustrating a record strip resulting from a complete cycle of operation;

DETAILED DESCRIPTION OF THE PREFERRED EMBODIMENTS

Figure 3:
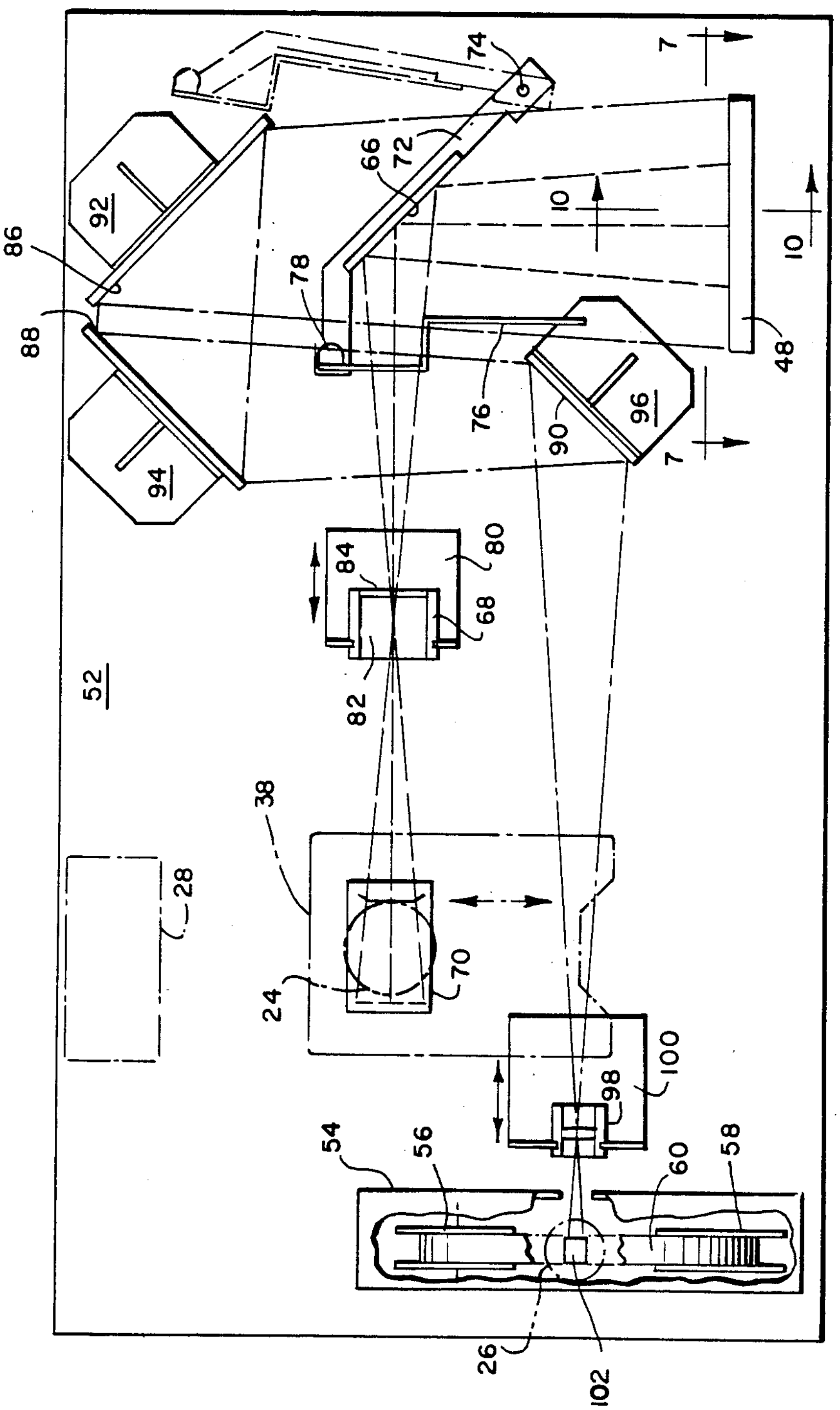
FIG. 3 is a rear elevation illustrating components supported by a chassis plate contained within the housing illustrated in FIGS. 1 and 2.

The several operating components of an identification camera system in accordance with the present invention are supported within a chassis housing generally designated in FIGS. 1 and 2 by the reference numeral 10. The configuration of the chassis housing 10 is a rectangular parallelepiped to provide rectangular front and back walls 12 and 14, respectively, spanned by a top wall 16, end walls 18 and a bottom wall (not shown). The housing 10 is supported pivotally from end plate standards 20 upstanding from a pedestal base 22. Presented at the front wall 12 of the housing 10, as shown in FIG. 1, are an ID camera objective lens 24, a record camera objective lens 26, a subject illuminating strobe lamp 28, a strobe quench photocell 30 and an aim lamp 32. The aim lamp 32 is conventionally employed in commercially available identification cameras and although not illustrated in the drawings, typically employs a lamp situated behind a focusing fresnel lens so that when the lamp is energized, a beam of light issuing therefrom may be positioned on the face of a subject to be photographed through the objective lenses 24 and 26. The aim lamp 32 is positioned behind a door 34 pivotally mounted in the front wall 12 of the housing 10 for access to replace bulbs.

The rear wall 14 is formed with a vertically oriented channel-shaped recess 36 for receiving a self-developing camera back 38 slidably mounted in ways 40 for movement between upper and lower positions in relation to the objective axis of the lens 24. The camera back 38 is also conventionally employed in many commercially available ID cameras and as such, is adapted to receive a film pack of self-developing film units of a size so that each film unit provides two identification cards. Movement of the camera back 38 to one or the other of the upper and lower positions determines which half of each film unit is to record the identification card, it being understood that each film unit is withdrawn from the back 38 after processing of two identification cards.

Also positioned on the back wall 14 of the housing 10 is an indicator lamp bezel 42, a record filmstrip door 43, an aiming handle 44, an initialization keylock 46 and a data carrier tray 48. While the function of the initialization keylock 46 and data carrier tray 48 will be described in more detail below, it will be noted that the aiming handle 44 carries at its upper end, a pushbutton 50 for actuation of the strobe lamp 28 and shutters (not shown) associated with the objective lenses 24 and 26 to expose ID and record film planes (to be described) to a portrait image of the subject of an identification card.

In FIG. 3 of the drawings, the rear face of a front chassis plate 52 contained within the housing 10 is shown with the relative positions of the objective lenses 24 and 26, the strobe lamp 28 and the ID camera back 38 depicted in outline by phantom lines. A recording camera 54 is supported from the wall 52 behind the objective lens 26 and, as shown in FIG. 3, includes supply and takeup spools 56 and 58, respectively, for feeding a record filmstrip 60 incrementally in frame-by-frame fashion to the axis of the lens 26. The record filmstrip 60 is preferably 16 mm film and may be of a type conventionally employed in motion picture cameras.

Figure 4:
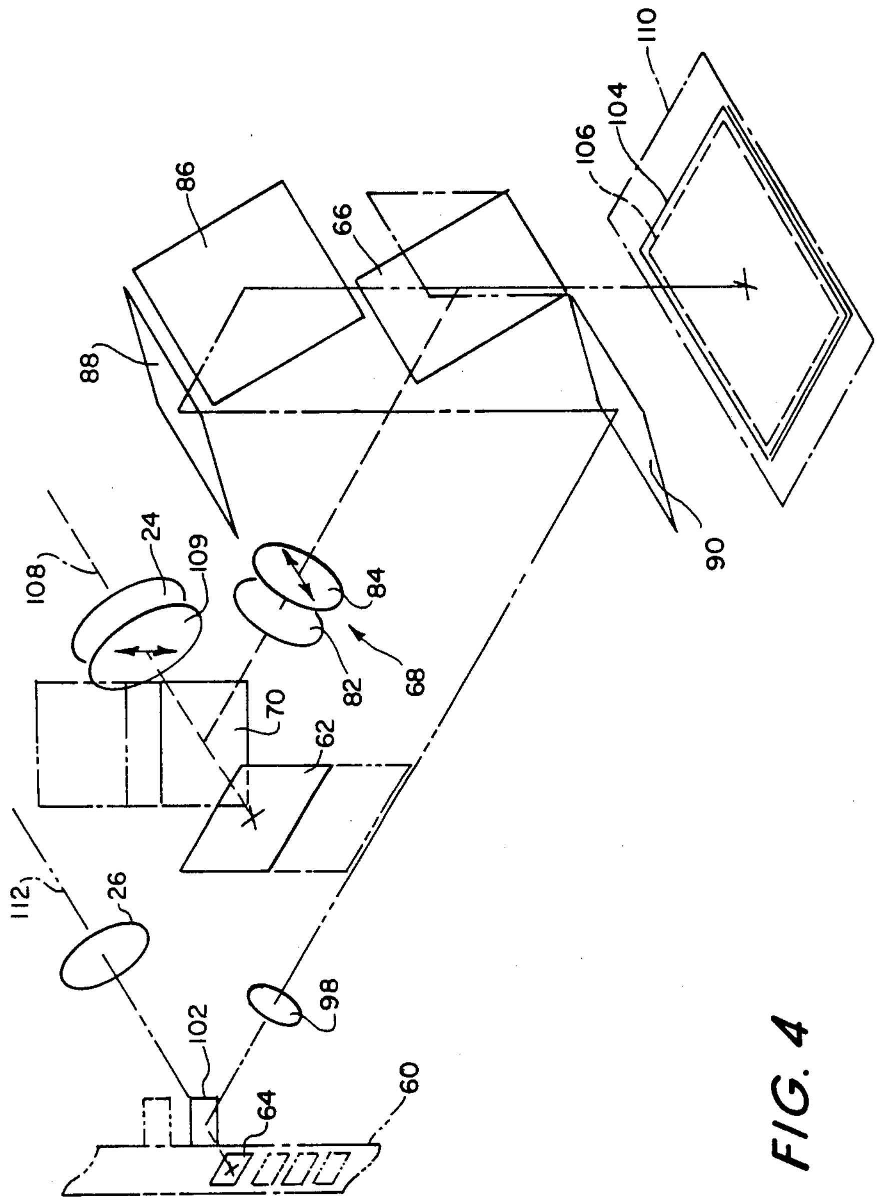
FIG. 4 is a schematic view in perspective illustrating the optical components of the system.

Optical components supported from the chassis plate 52 and by which light directed from the upper surface of the data carrier tray 48 is presented as an image at the film planes 62 and 64 (FIG. 4) of the camera back 38 and record camera 54, respectively, an shown in FIGS. 3 and 4 to include for the ID camera film plane 62, a first moveable mirror 66, an ID data imaging lens unit 68, and a second moveable mirror 70 positioned between the film plane 62 of the ID camera back 38 and the objective lens 24. As shown in FIG. 3, the first moveable mirror 66 is mounted on a bracket 72 pivotally supported at its lower end by a pintel 74 secured in the chassis plate 52 for movement between an operative position as shown in solid lines in FIG. 3, and an inoperative displaced position depicted in phantom lines. The bracket 72 extends forwardly of the mirror 66 at its upper end to support a shade or mask 76 depending from a pivotal support 78 on the bracket 72 freely so as to assume the position shown in solid lines in FIG. 3 under the influence solely of gravity. When the bracket 72 is moved to its displaced position as represented by phantom lines in FIG. 3, the shade 76 will overlie the mirror 66 to inhibit reflection of stray light.

The lens unit 68 is supported from a bracket 80 adapted to be adjustably fixed against the rear surface of the chassis plate 52 by appropriate means (not shown). In addition to supporting an imaging lens 82, the unit 68 supports a polarized filter 84 oriented on a predetermined axis of polarization to be described in more detail below. In light of the organization of mirrors 66 and 70 together with the lens unit 68, it will be appreciated that light reflected from the top of the data carrier tray 48 will proceed along the dashed lines in FIGS. 3 and 4 to present an image of the top surface of the tray 48 at the film plane 62 of the ID camera back 38.

An image of the top of the tray 48 is presented to the film plane 64 of the record camera 54 by an optical path including first, second and third fixed mirrors 86, 88 and 90, respectively. While the mirrors 86, 88 and 90 are characterized as fixed, they are supported respectively from brackets 92, 94 and 96 so that they may be adjusted to the fixed position in which they are oriented in operation of the system. The optical path between the top of the data carrier tray 48 and the film plane 64 of the record camera 54 further includes a data imaging record lens unit 98 supported by bracket 100 to be adjustably positioned on the back of the chassis plate 52. The image formed by the lens unit 98 is presented to the record camera film plane 64 by a third moveable mirror 102 supported between the lens 26 and the film plane 64.

The system of optical paths to the respective film planes 62 and 64 is shown most clearly in FIG. 4 in which a data carrier in the form of a rectangular card 104, adapted to be supported at the top of the carrier tray 48, is shown in solid line form. The fields of view presented to the ID film plane 62 and to the record film plane 64 are represented respectively by dashed and dash/dot rectangles superimposed on the card 104. As described above, therefore, an image of a field 106, representing an area substantially the same as or smaller than the card 104, is presented to the ID film plane 62 by the lens 82 upon reflection of light rays directed from the card to the mirror 66, through the lens 82 and the second moveable mirror 70. Movement of the second moveable mirror 70 to the phantom line position illustrated in FIG. 4 permits an image of a subject (not shown) aligned with the axis 108 of the lens 24 to be presented also to the ID film plane 62. It will be noted that a second polarized filter 109 is located on the axis behind the lens 24. Also, the polarization axis of the filter 109 is perpendicular to the polarization axis of the filter 84.

With the first moveable mirror 66 pivoted to its displaced position as represented by phantom lines in FIG. 4, a record field 110 is presented to the record film plane 64 by light directed from the field 110 successively to the fixed mirrors 86, 88 and 90, through the lens 98 to the third moveable mirror 102 and to the film plane 64. With the mirror 102 moved to the phantom line position, the image of the subject on the axis 112 of the record objective lens 26 will be presented also to the record image plane 64.

Figure 5:
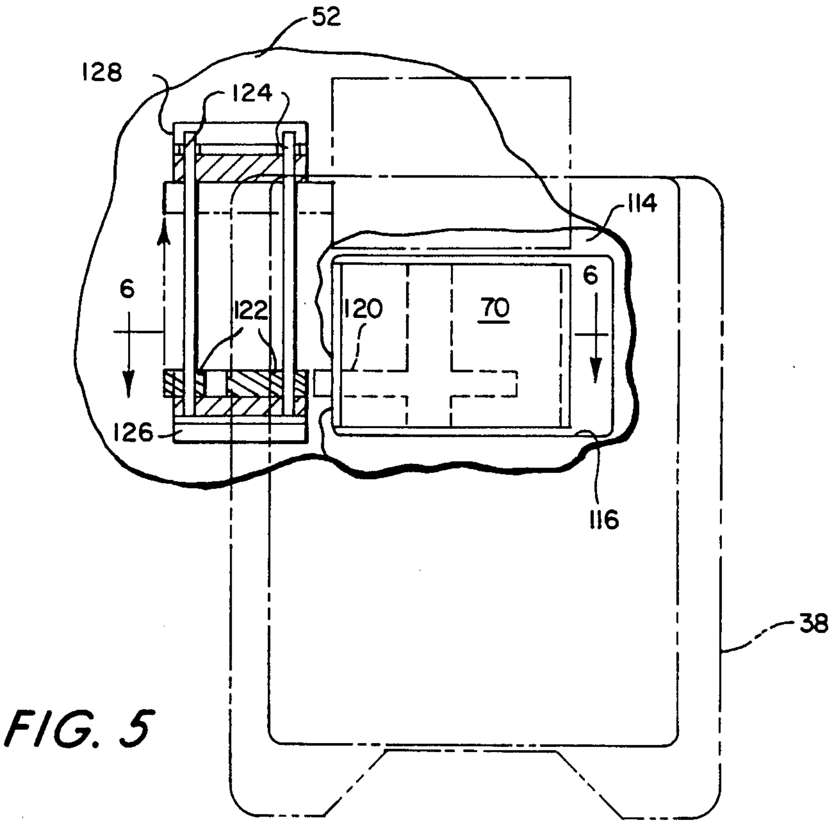
FIG. 5 is a fragmentary rear elevation in partial cross-section showing a mirror support arrangement incorporated in the system.
Figure 6:
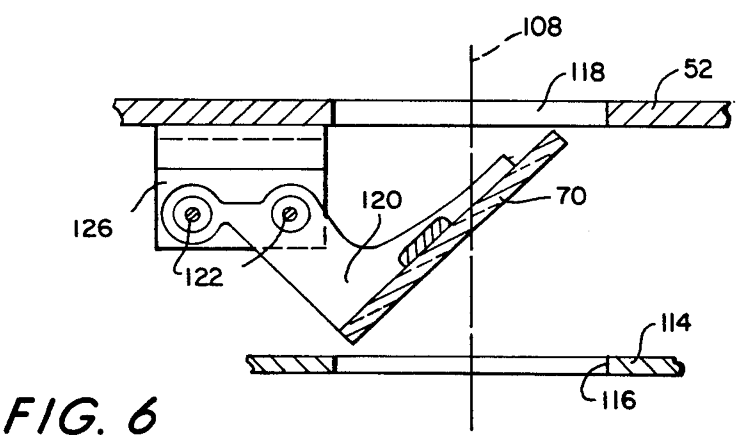
FIG. 6 is a fragmentary cross-section on line 6—6 of FIG. 5.

An exemplary embodiment of a support for the second moveable mirror 70 is illustrated in FIGS. 5 and 6 of the drawings. In these figures, the chassis plate 52 is again shown in part and further, as being spaced forwardly of a filmpack mask 114 having a rectangular opening 116. Also, it will be noted that the chassis plate is provided with an opening 118 which, like the opening 116, is aligned on the axis 108 of the ID objective lens 24.

The mirror 70 is supported from a cast bracket 120 having a pair of circular bushings 122 adapted to slidably receive a pair of parallel vertical rods 124. The rods are anchored at their base in a support bracket 126 and at their upper ends in a support bracket 128, both such brackets being secured to the back of the chassis plate 52. Though not illustrated in the drawings, it will be appreciated that this mounting arrangement for the mirror 70 facilitates its movement by means of a solenoid (not shown) or the like, as well as accurate positioning thereof, particularly in its operative lower position on the axis 108.

While details of the support for the third moveable mirror 102 for movement between an operative position on the record objective axis 112 and an inoperative elevated position are not shown in the drawings, it will be appreciated that this mirror may be supported similarly as the described support for the mirror 70. Also, either one or both of the mirrors 70 and 102 may be pivotally supported in the manner of conventional reflex mirrors though the support thereof on ways or equivalent is preferred from the standpoint of space conservation and absolute registration.

Figure 7:
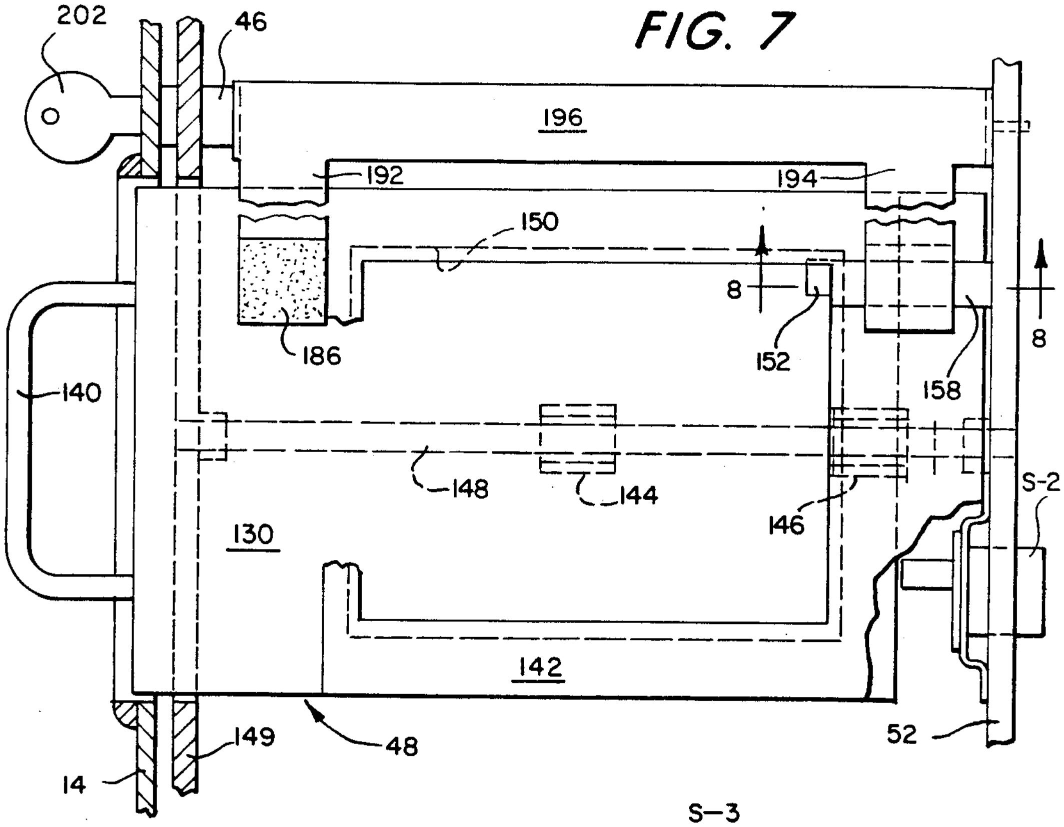
FIG. 7 is an enlarged fragmentary cross-section on line 7—7 of FIG. 3.
Figure 8:
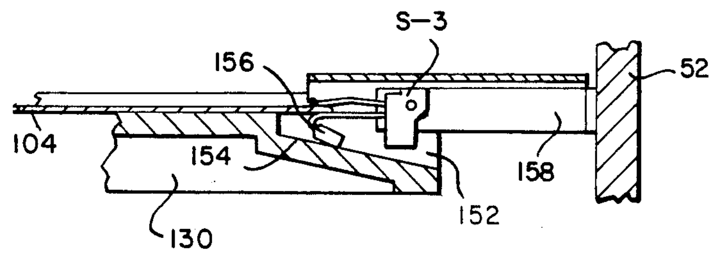
FIG. 8 is an enlarged fragmentary cross-section on line 8—8 of FIG. 7.
Figure 9:
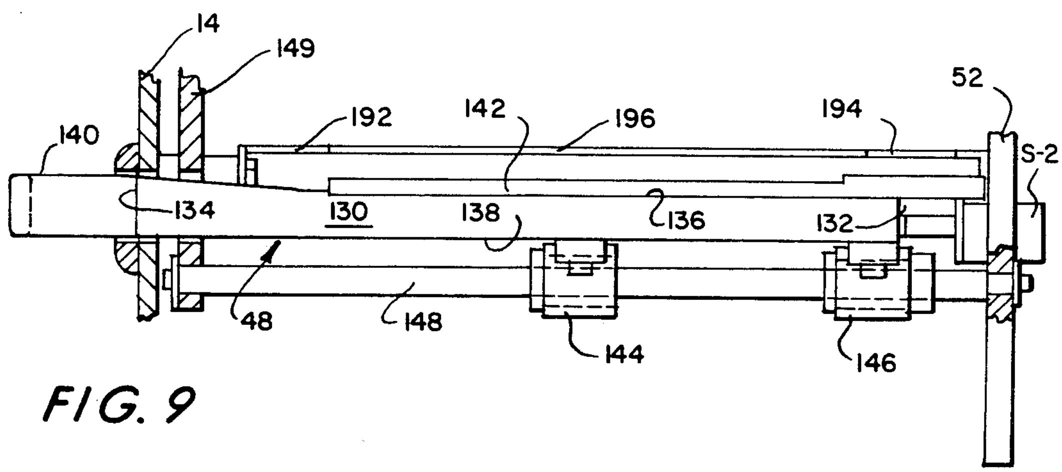
FIG. 9 is a side elevation of the components illustrated in FIG. 7.

The construction of the tray 48 and related chassis-supported components is illustrated most clearly in FIGS. 7–9 of the drawings. The tray structure includes a molded base 130 having front and rear edges 132 and 134, as well as top and bottom surfaces 136 and 138, respectively. A handle 140 is secured to the rear edge 134 whereas a generally U-shaped tray cap 142 is secured to the top surface 136 of the tray body 130. Also, as may be seen in FIG. 7 and 8, the tray cap projects forwardly of the front edge 132 of the base 130. To the bottom surface 138 of the tray body 130 are secured a pair of guide bushings 144 and 146 for slidably engaging a guide rod 148 secured at opposite ends in the front chassis plate 52 and in a rear chassis plate 149. In light of this organization, it will be appreciated that the tray 48 is permanently secured within the housing 10 but is moveable between an operative position as shown in FIGS. 7–9 and an inoperative or retracted position in which it is drawn outwardly from the rear wall 14 of the housing until the bushing 144 engages the rear chassis plate 149. In the retracted position, a data carrier such as the data card 104 may be placed into and secured by the tray cover for presentation at the top surface of the tray body 130. To this end, the tray cap is provided with an undercut lip 150 to engage the peripheral edges of a card placed thereinto.

As shown in FIGS. 7 and 8, the front left corner of the tray body 130 is provided with a forwardly opening recess 152 which extends rearwardly to a point beyond the front edge of a card 104 properly oriented in place on the tray 48. The recess 152 defines a rearwardly and upwardly inclined ramp 154 for engagement by a follower component 156 on a switch S-3 supported by a bracket 158 from the front chassis wall 52. The card 104 will prevent closure of the switch S-3 when properly positioned in the tray 48. If a card is not present or if the card is not properly positioned by the tray cap 142, movement of the tray 48 toward the front chassis plate 52 will result in closure of the switch S-3 to indicate this abnormality. Another switch S-2 is supported from the front chassis plate 52 in a position to be engaged by the front edge 132 of the tray body 130 when the tray 48 is advanced fully into its operative position as shown in both FIGS. 7 and 9 of the drawings. As will be described in more detail below, the closure of the switch S-2 initiates a data recording portion of the identification card cycle carried out by the system of the present invention.

Figure 10:
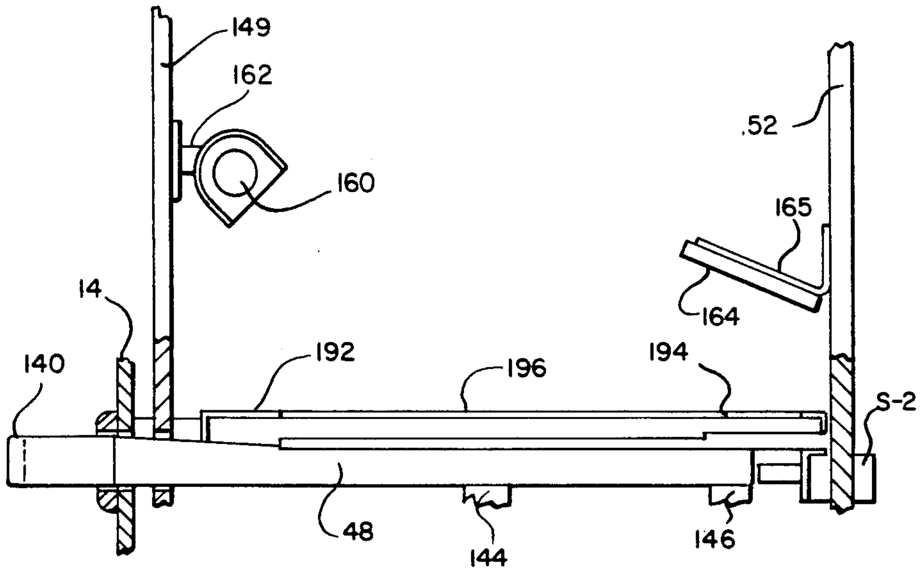
FIG. 10 is an enlarged fragmentary cross-section on line 10—10 of FIG. 3.
Figure 11:
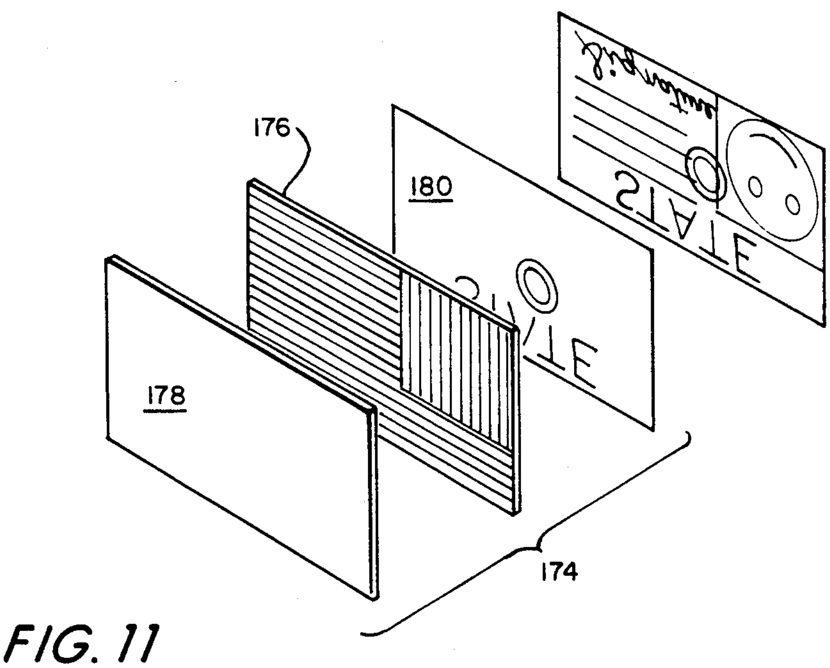
FIG. 11 is an exploded perspective view illustrating the polarizer and negative of the identification card produced by the system of the present invention.
Figure 12:
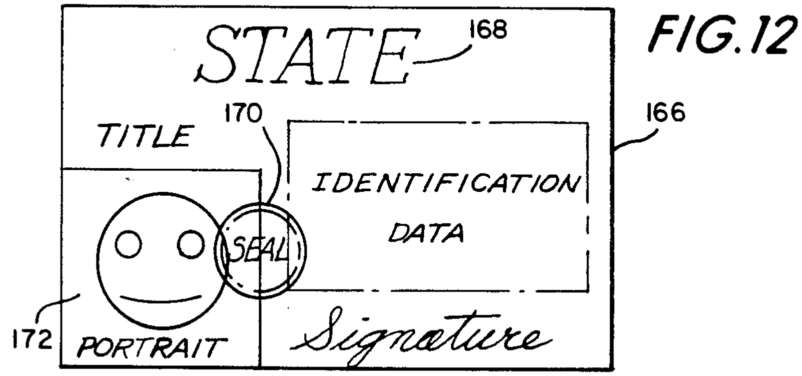
FIG. 12 is a positive image of an exemplary identification card produced by the present invention.

In FIG. 10, a source of illumination for the upper surface of the tray 48 is illustrated to include a data strobe lamp 160 secured by a bracket 162 to the front of the rear chassis plate 149 and reflecting mirror 164 supported by a bracket 165 from the rear of the front chassis plate 52. The strobe lamp 160 is directed downwardly to the top surface of the tray 48 at an angle ranging from 30° to 45° to the vertical, whereas the reflecting surface of the mirror 164 is oriented at between 15° and 20° to the vertical. As a result of this organization, light emitted from the strobe unit 160 and directed against the top of the tray 48 will be augmented by the reflection of light from the mirror 164 back to the top of the tray 48. Light originating with the strobe unit 160 will, of course, be the light from which the image of a data carrier supported by the tray is presented to both the ID film plane 62 and the record film plane 64 as described above with reference to FIGS. 3 and 4 of the drawings.

To facilitate an understanding of the manner in which the identification card system and method of the present invention is used in practice, reference is made to FIGS. 11–14 of the drawings which illustrate various data formats incident to such use. Thus, in FIG. 12, an exemplary identification card 166 provided by the invention is illustrated as including three basic types of information; namely, (1) the designation of the identification card issuing agency such as the name of the state 168 and other authority indicating indicia such as a seal 170, (2) a portrait 172 of the subject to whom the identification card 166 applies, and (3) identification data applicable to the subject which may include a photograph of the applicant's signature.

The identification card 166, in itself, predates the present invention and may be formed using a conventional identification camera system equipped with an optical system for simultaneously or sequentially exposing a film unit of the type carried in the film back 38 to an appropriate data card and to the subject. Also, such conventional identification card cameras employ a polarizing plate 174 shown in FIG. 11 to include an orthogonally polarized layer 176 sandwiched between a pair of transparent sheets or plates 178 and 180. The polarizer plate 174 is located at the film plane of the ID camera back 38. The orthogonally polarized component 176 thereof cooperates with the polarized filters 84 and 109 (FIG. 4) so that the subject area of the portrait 172 and the data area for all other data on the identification card 166 and personal to the subject are mutually exclusive. In other words, imaging light passing from a data card to the film plane 62 is blocked from the area 172 reserved for the photograph of the subject on the ultimate card 166 and similarly, imaging light passing along the axis 108 from the subject of the portrait 172 is blocked or masked by the polarizing plate 174 from the other or data portions of the ultimate ID card 166.

Also, it will be noted that the polarizing plate 174 is customized or validated by supporting on the sheet 180 thereof, indicia to be received on the card 166 and all others like it. In particular, the designation of the card authorizing agency such as the name of the state 168, as well as the state seal 170, are incorporated in the polarizer as a mask to provide an image thereof on the identification card 166. As such, the plate 174 functions as a "validation plate" and will be referred to as such in microprocessor flow charts illustrated in the drawings. Further, the plate 174 is moveable by means (not shown) between a "pulled in" position to lie in the film plane 62 and a "released" position spaced from the film plane 62. The released position of the plate allows film units in the back 38 to be pulled therefrom without deleterious contact by the plate 174.

Figure 13:
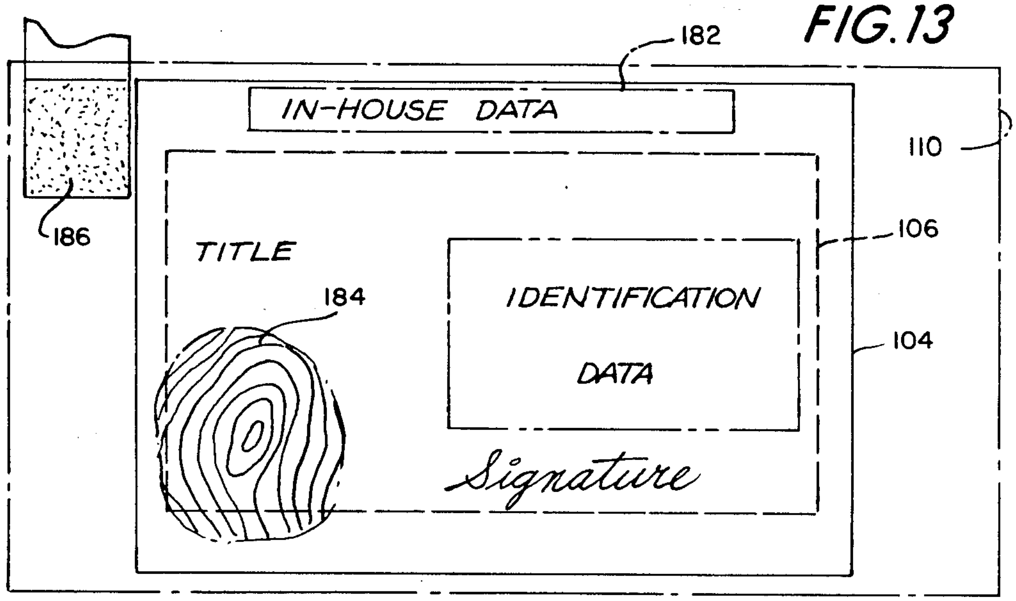
FIG. 13 is a plan view of a data carrier employed in the invention.
Figure 14:
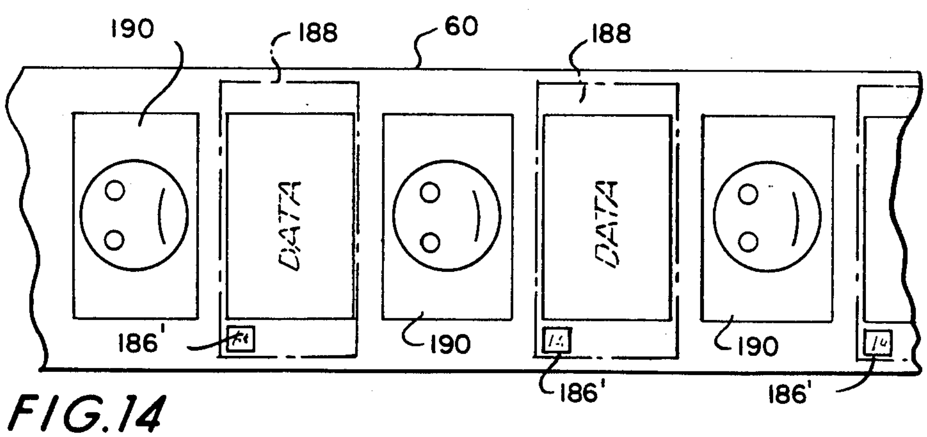
FIG. 14 is a fragmentary plan view illustrating a section of record film provided by the system of the present invention.

The data carrier or card 104 used with the present invention is illustrated in FIG. 13 to include the identification data and signature to be received on the card 166. This data on the card 104, referred to herein as "card data", will lie within the field of view of the ID camera back 38 as represented in FIG. 13 by the dashed line 106. In addition to the information to be received on the identification card 166, the data card 104 preferably includes an area 182 for "in-house data". Such data may be typed or otherwise provided on the data card 104 but is intended for administrative purposes only and not to be included on the identification card 166. To this end, the area 182 lies outside the field 106 of the ID camera back 38. Also on the data card 104 is a fingerprint 184 of the subject to whom the identification card 166 is to be issued. The fingerprint is located in an area masked from reproduction on the identification card 166 by the polarizer plate 174 as reserved for the portrait 172 of the subject. Finally, a film record blip tab 186 is positioned to one side of the card 104 but within the field 110 of the record camera 54. All such data presented to the record camera 54 is referred to herein as "record data" and as such, includes the previously described "card data".

In the operation of the system, the recording of each identification card will involve two consecutive frames on the filmstrip 60 in the record camera 54. In other words, the full quantum of record data falling within the field 110 in FIG. 13 is duplicated on alternate frames 188 of the filmstrip 60 with intermediate frames 190 reserved for a portrait of the subject. The presence of a blip 186' between portrait and data frames serves to identify the information relevant to a single identification card 166.

The blip tab 186 which results in the blip 186' adjacent one side of each of the frames 188 on the record filmstrip 60 is provided by an apparatus incorporated in the system of the invention principally for purposes of security and indexing. As shown in FIGS. 7, 15 and 16 of the drawings, the blip tab 186 is represented by a stippled area on one of two tabs 192 and 194 projecting from a base 196 extending between the front and rear chassis walls 52 and 148, respectively. The base 196 is pivoted in the front chassis wall 52 by a pintel 198 and is secured for rotation with keyed components of the lock 46 secured in the rear chassis wall 148. A key 202 for the lock 46 is presented at the rear of the housing 10 adjacent the opening for the tray 48 as may be seen in FIGS. 2, 7, 15 and 16.

By manipulation of the key 202, the tabs 192 and 194 may be positioned in either of the two positions illustrated in FIGS. 15 and 16 of the drawings. Thus, in FIG. 15 of the drawings, the tabs 192 and 194 are located over the top of the data tray 48, whereas in FIG. 15, the tabs are pivoted to a vertical position displaced from the tray 48. The tray cap is provided with a stippled area 204 which underlies the tab 194 when the tabs are pivoted to the down position shown in FIG. 15 and with the data tray in its inward and operative position. Thus, the stippled area 204 will be presented to the film plane 64 of the record camera when the tabs are displaced from the tray 48 and will be covered by the tab 194 when the blip area 186 overlies the tray 48.

The system of the invention is initialized by supervisory personnel having in his possession the key 202 and a supervisory data card (not shown). To so initialize the system, the supervisory person inserts the key into the lock 46, turns the tabs 192 to their displaced position as shown in FIG. 16, inserts a supervisory data card into the tray 48 and pushes the tray inward to expose a frame 205 on the record filmstrip 60 to the supervisory data card. The supervisory data card may include such information as identification of the supervisory person, the location of the system as well as other such information as the date of operation and the like. After the frame 205 on the record filmstrip 60 is exposed, the key 202 is turned to position the tabs 192 and 194 in the position shown in FIG. 15. The key 202 is withdrawn and the system is now initialized or ready for a period of operation by regular operators.

After operation to provide the record strip 60 with alternate data and portrait frames 188 and 190 as described above with reference to FIG. 14, each pair of data and portrait frames having a blip 186' on one side of the filmstrip 60, the supervisory person closes out a day or other selected period of operation by again inserting his or her supervisory data card into the tray 48 and exposing a closing frame 206 on the record filmstrip 60. Both the initializing frame 205 and the closing frame 206 will be provided with a blip 208 located on the opposite side of the filmstrip 60 from the identification card blips 186'. As a result of the initialization system, therefore, a complete record of use of the identification camera system is provided as well as an indication of participation by select supervisory personnel.

A significant further measure of security is provided in the overall system of the present invention as a result of automated operation initiated by minimal action on the part of the operator. To facilitate an understanding of the automated operation, the following table identifies the various switches incorporated in the system and the function performed by each switch.

| INDEX OF SWITCHES | |
|---|---|
| S-P | Main power switch |
| S-1 | System lock-initialized/not initialized |
| S-2 | Data carrier tray 48-closed/open |
| S-3 | Card 104-present/not present |
| S-4 | First moveable mirror 66-operative/displaced |
| S-5 | ID mirror 70-in position/not in position |
| S-6 | Filmpack present/not present |
| S-7 | Film back 38-up/down |
| S-8 | Film pulled/not pulled |
| S-9 | Film door 43 closed (microfilm) |
| S-10 | Third moveable mirror 102-in position/not in position |
| S-11 | Exposure light at record film plane 64-adequate/not adequate |
| S-12 | Record film supply adequate/low |
| S-13 | Record film wind/no wind |
| S-14 | Portrait button 50-actuated/not actuated |
| S-15 | Validation plate 174 pulled in/released |
| S-16 | Interrupts power when aim light door 34 is open |

While several of the switches such as S-2 and S-3 which have been identified previously are in the nature of electromechanical switches, others may be in the nature of diodes or other purely electronic switching devices. Also, such switches as S-P and S-14 are manually activated switches.

Operation of various moveable components will involve motors such as solenoids or the like by which the respective components are moved on signals generated originally by switches. Thus, the following table provides a listing of motors and functions performed by each motor.

| INDEX OF MOTORS | |
|---|---|
| M-1 | Moves first moveable mirror 66 |
| M-2 | Moves second moveable mirror 70 |
| M-3 | Moves third moveable mirror 102 |
| M-4 | Activates ID camera shutter |
| M-5 | Activates record camera shutter |
| M-6 | Activates record camera film advance |
| M-7 | Activates validation plate |

From the index of motors it will be appreciated that each of the identified components may be actuated between the positions previously mentioned.

Figure 18:
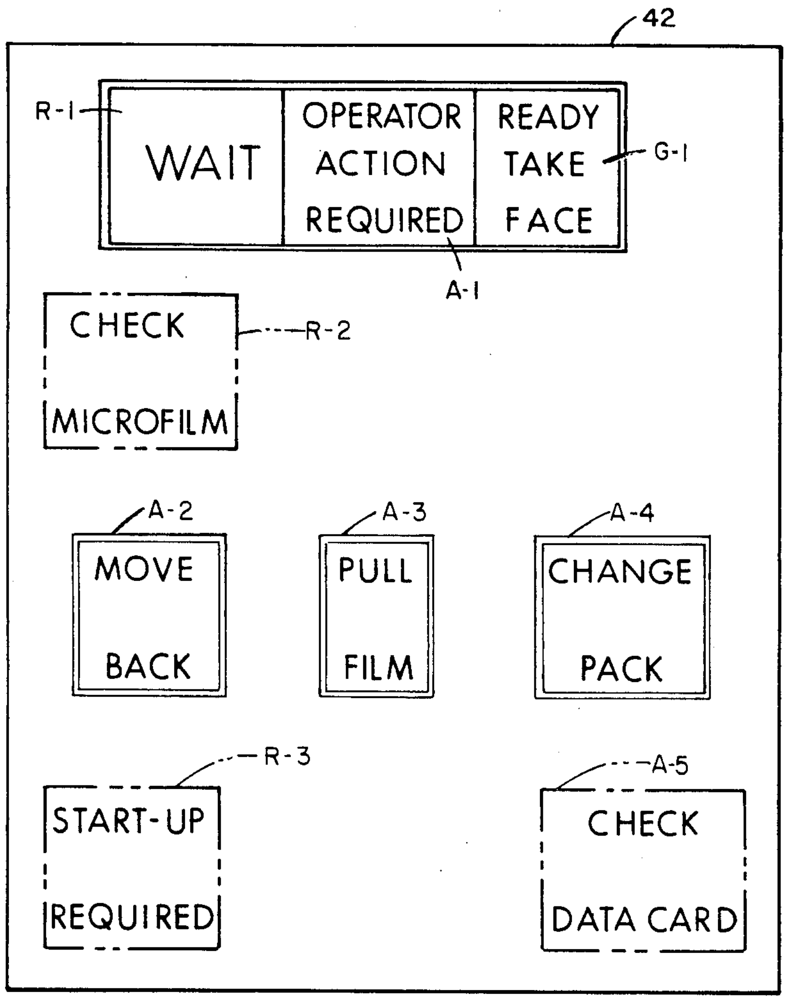
FIG. 18 is an enlarged elevation of a lamp bezel presented on the rear exterior housing of the invention.

In FIG. 18 of the drawings, the lamp bezel 42 on the back of the housing 10 and previously described with reference to FIG. 2, is shown in substantially greater detail. Each of the legends provided on the bezel 42 is situated to cover a lamp, specifically an LED (not shown), but which may be designated both by reference to the information provided by the illumination of such lamp and by color of each lamp. With respect to color, red lamps are used for the legends "Wait", "Check Microfilm" and "Start-up Required" and, as such, are designated R-1, R-2 and R-3, respectively, in FIG. 18 (and in FIG. 19). A green lamp (or LED) G-1 illuminates the "Ready Take Face" legend on the bezel 42 and may be operated in a steady mode when the system is ready for operation in general, or in a flashing mode when the operator is instructed to depress the portrait button 58. All other legends on the bezel 42 are illuminated by amber lights designated A-1, A-2, A-3, A-4 and A-5, respectively.

Figure 19:
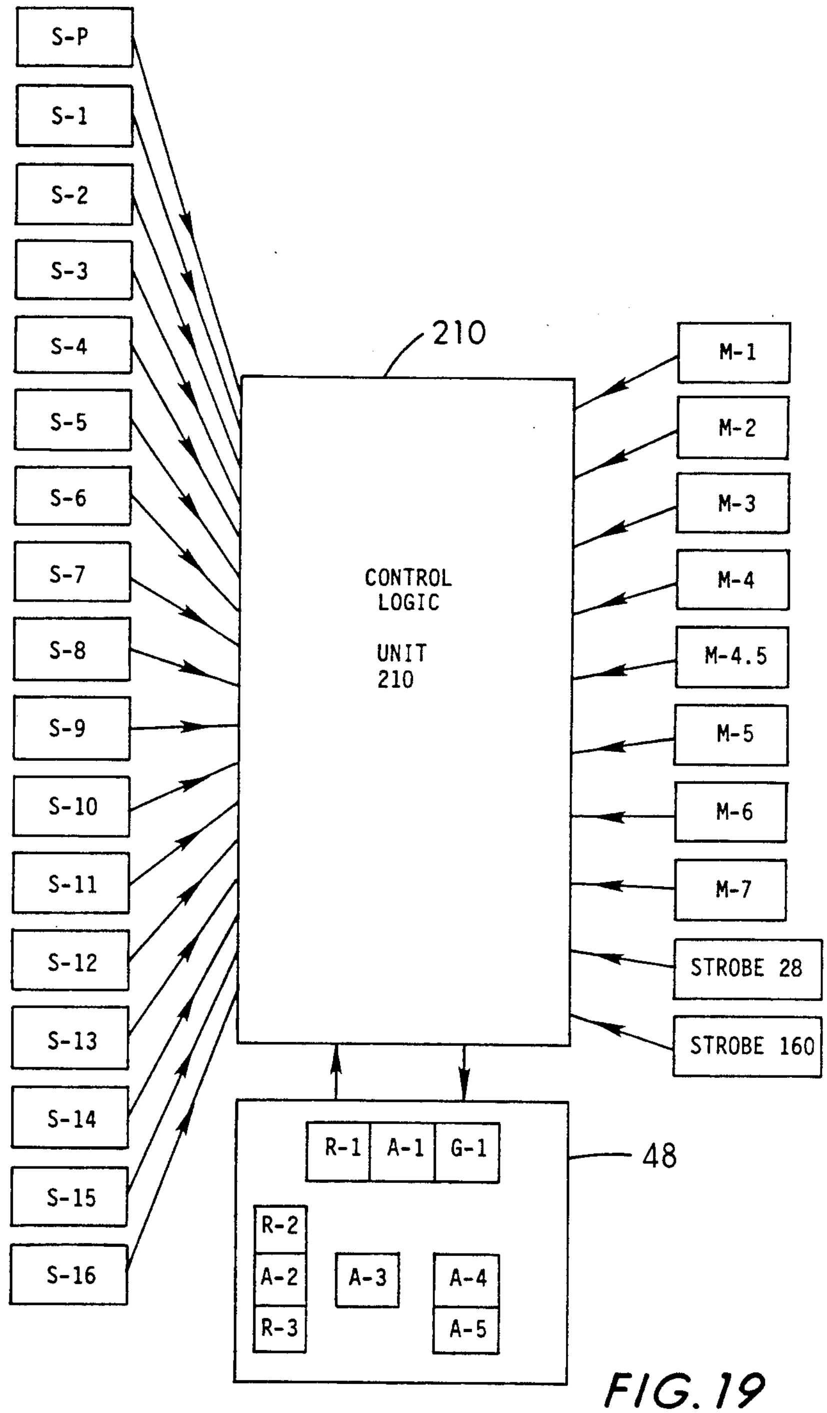
FIG. 19 is a logic diagram applicable to the invention.

In FIG. 19 of the drawings, the system logic is illustrated in which a logic unit 210 operates in response to signal indications from the several switches indicated to either actuate the motors M-1 through M-7 or to illuminate the lamps identified above with respect to FIG. 18. In addition, the logic unit 210 will actuate the respective strobe lamps 28 and 160.

Figure 20A:
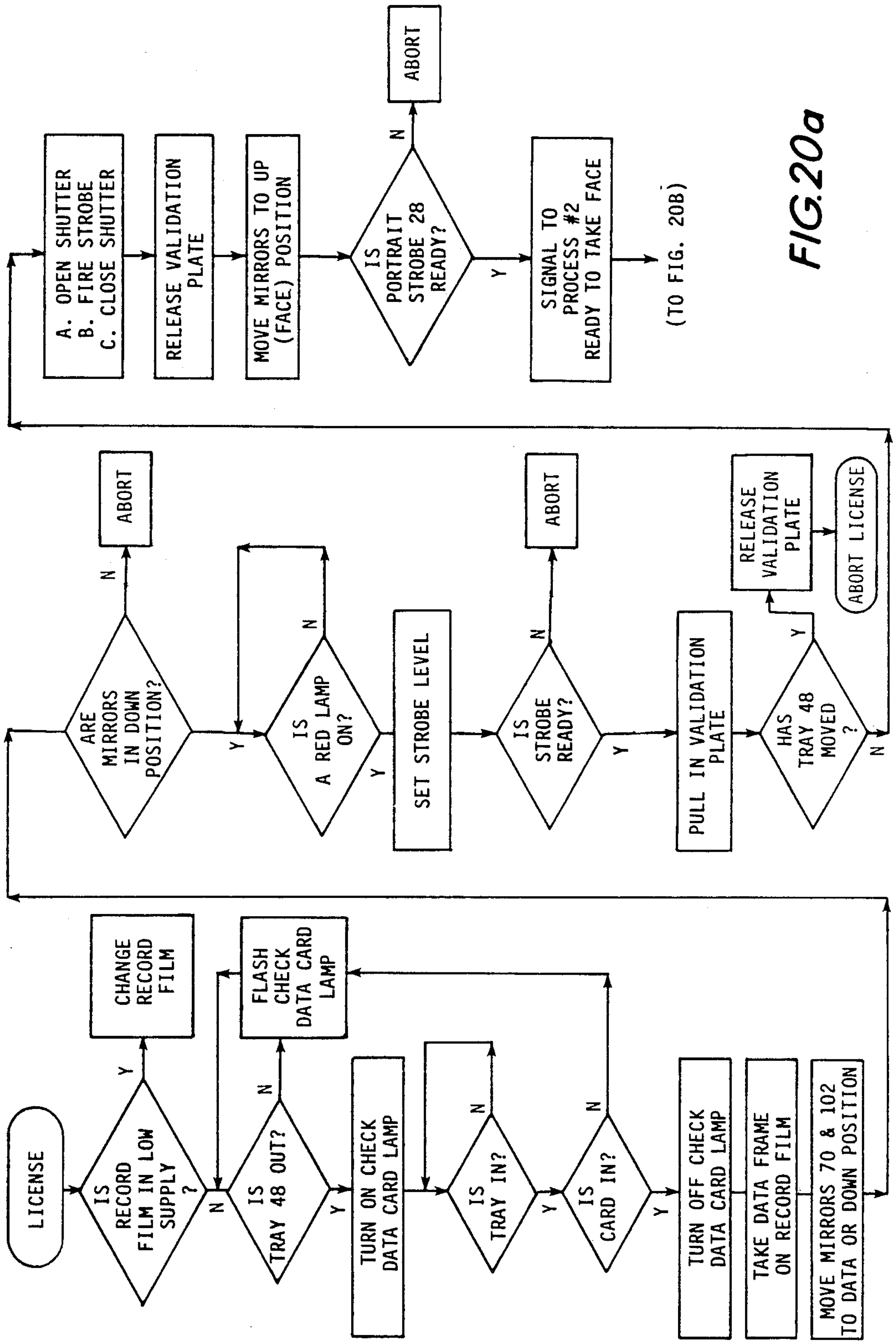
FIGS. 20A and 20B are contiguous microprocessor flow diagrams for a "License" process.
Figure 20B:
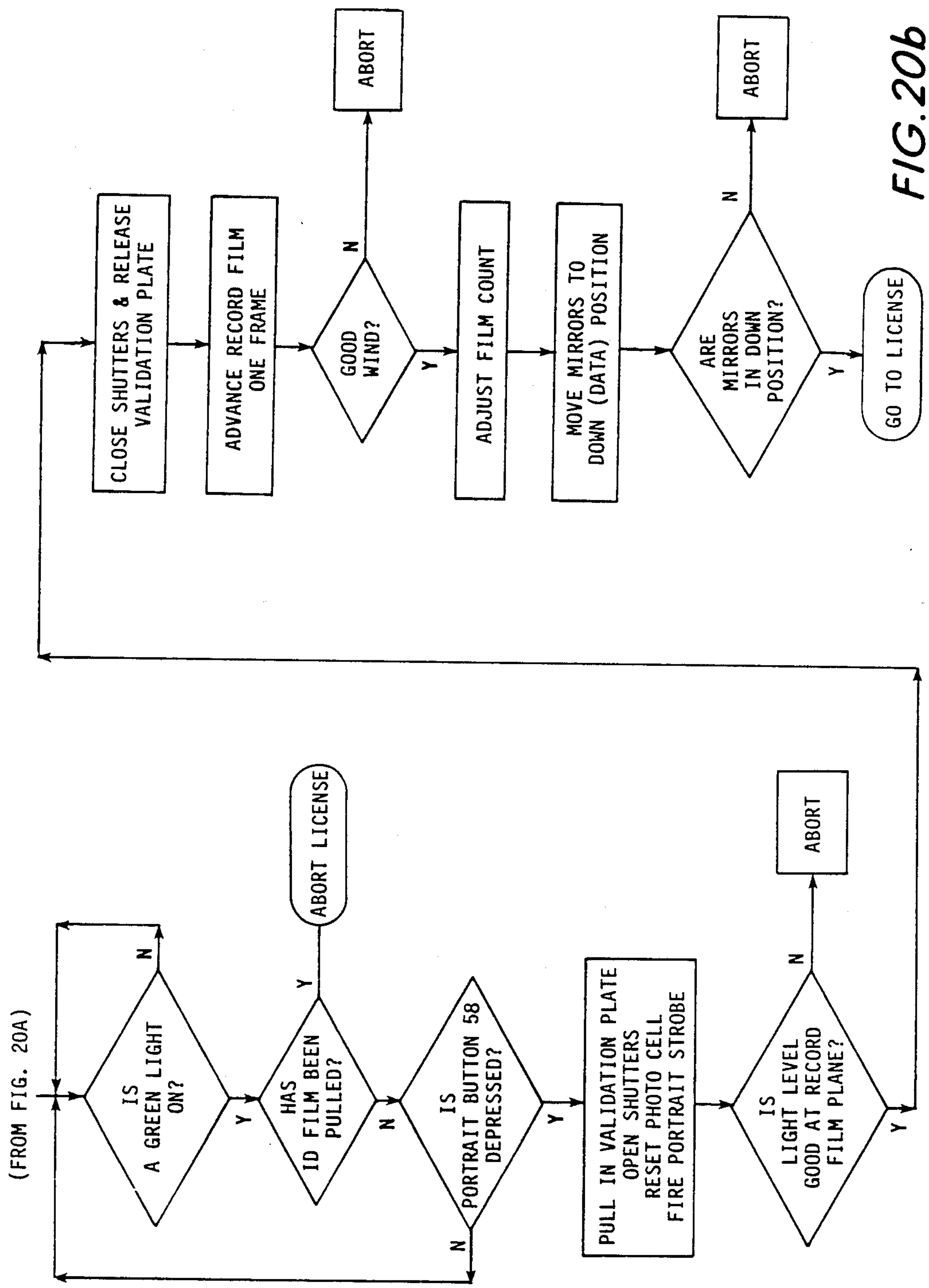
Figure 21A:
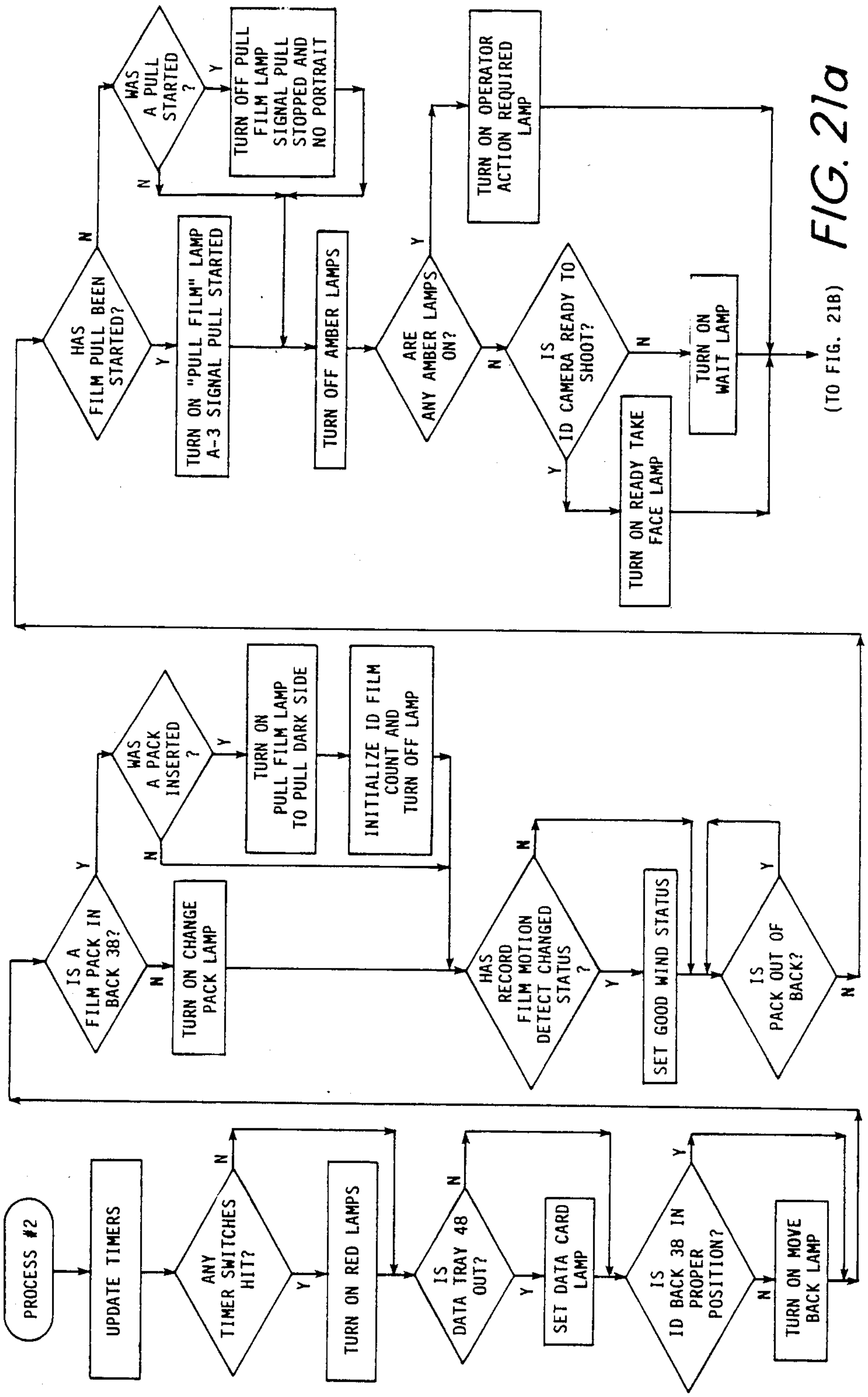
FIGS. 21A and 21B are contiguous microprocessor flow diagrams for illustrating a "Process #2"
Figure 21B:
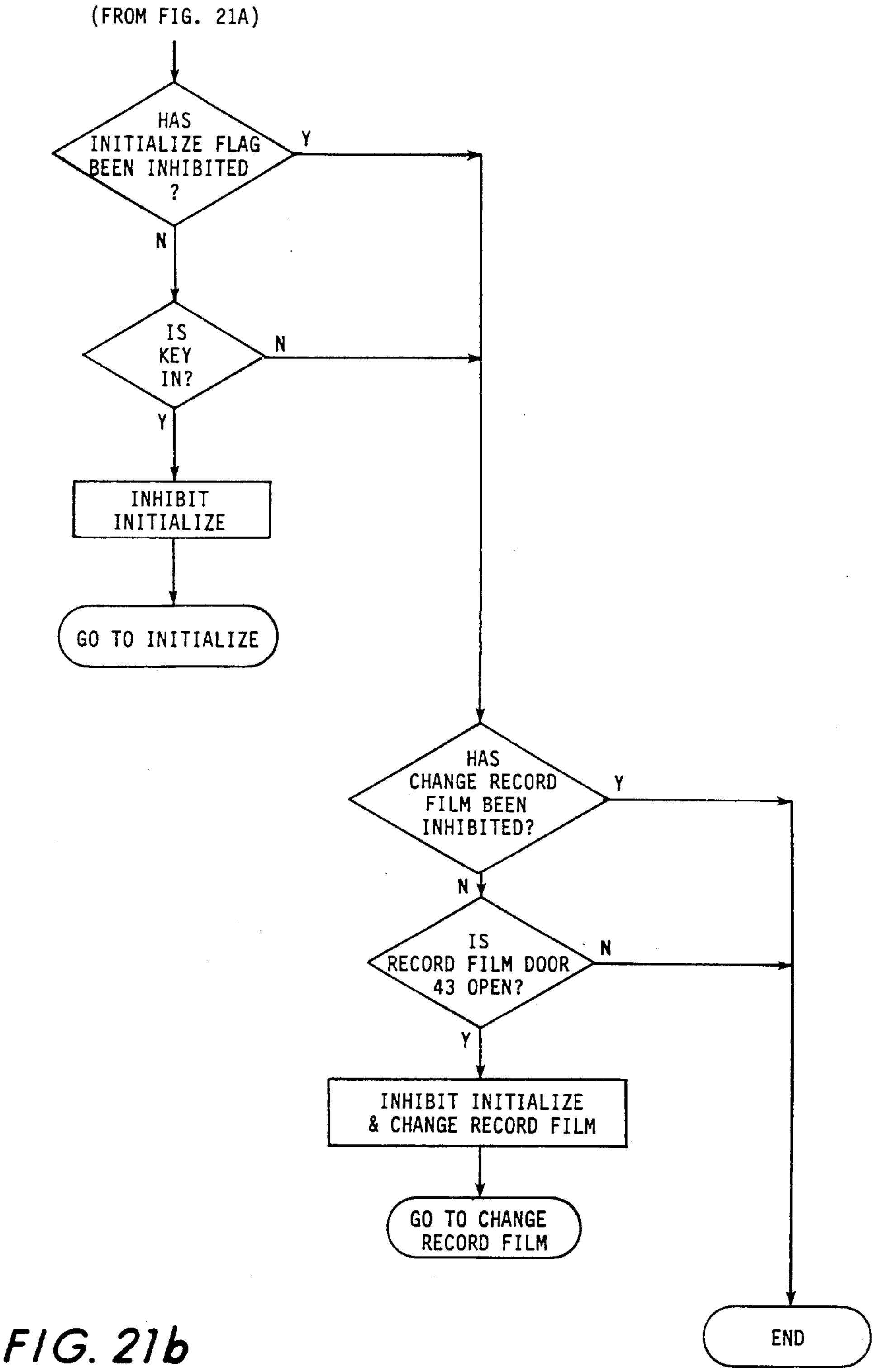
Figure 22:
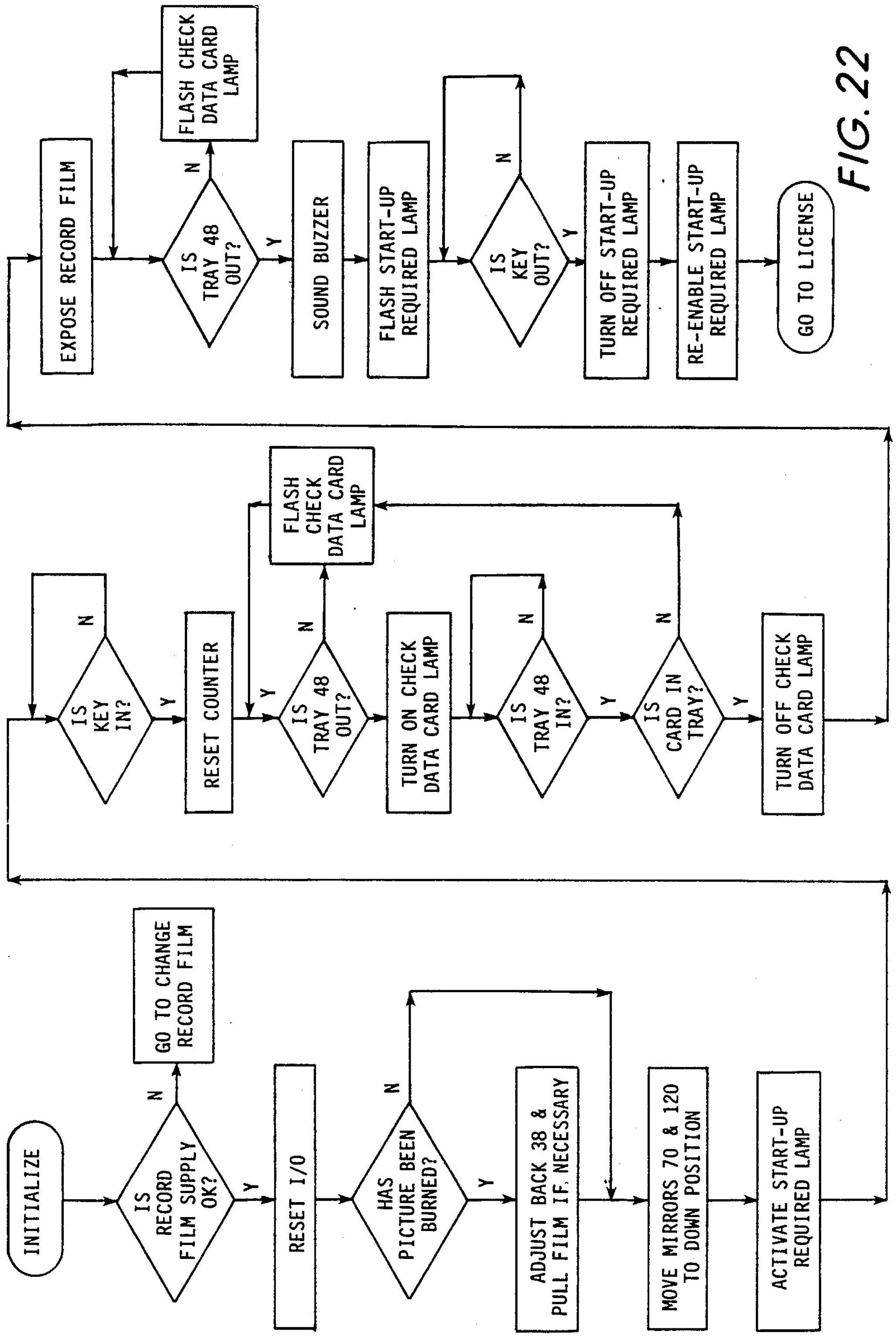
FIG. 22 is a microprocessor flow diagram illustrating an "Initialize" process of the invention.
Figure 23:
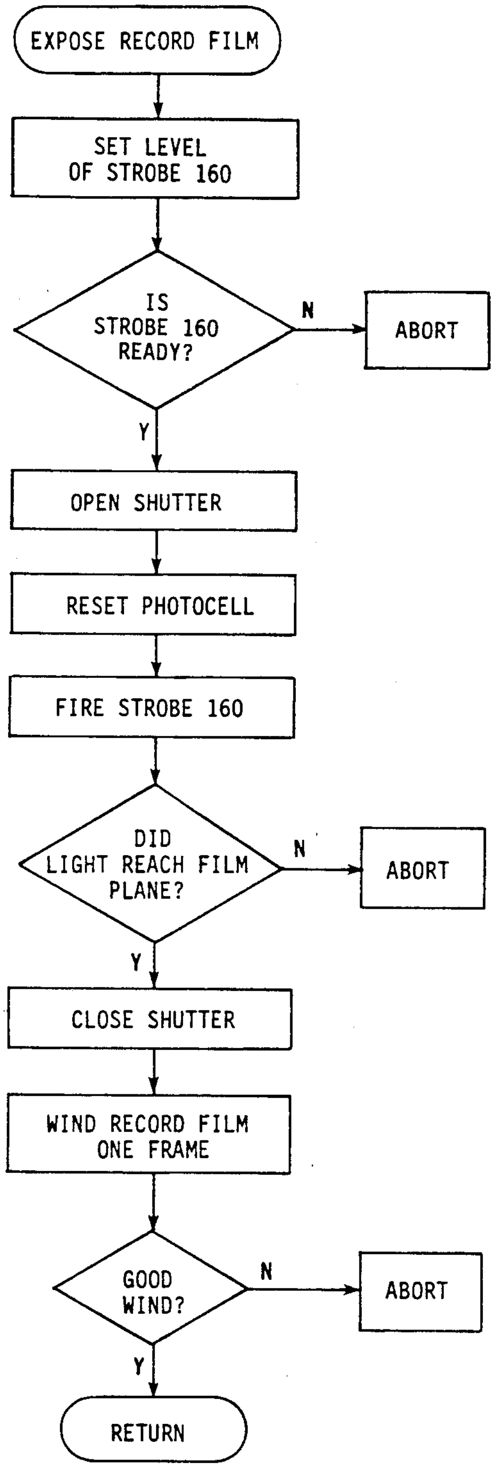
FIG. 23 is a microprocessor flow diagram illustrating an "Exposed Record Film" process.
Figure 24:
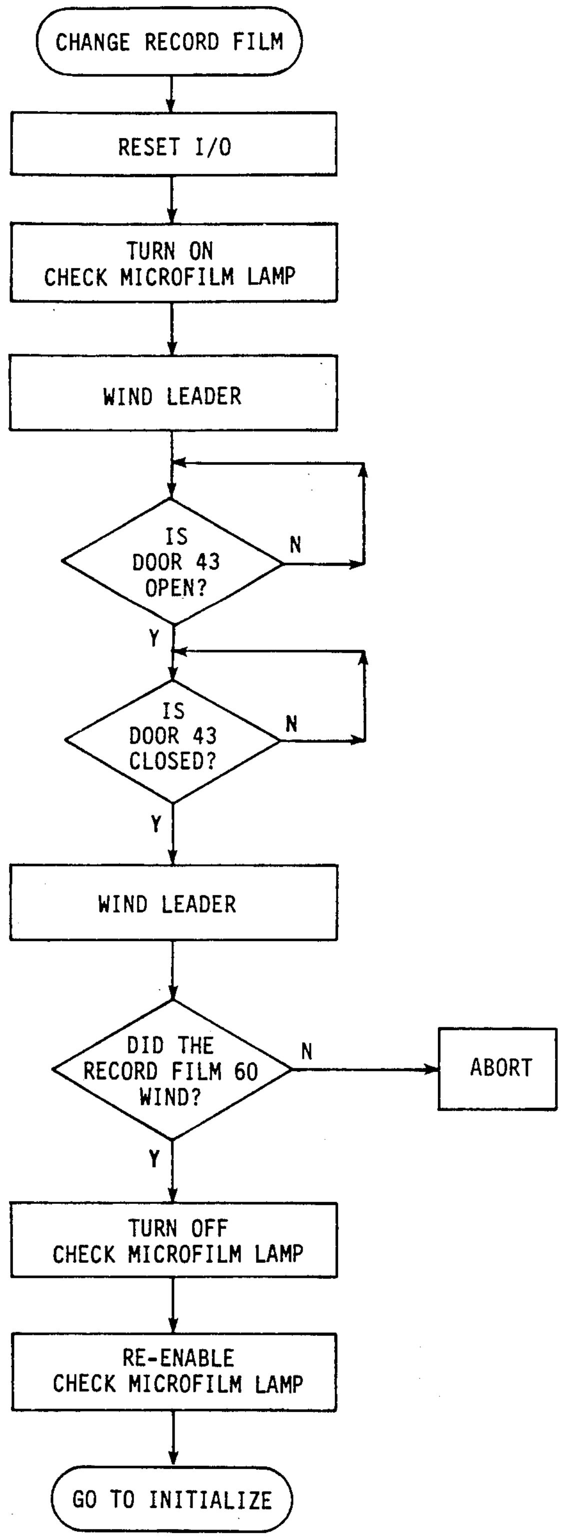
FIG. 24 is a similar flow diagram illustrating a "Change Record Film" process.

Operation of the system may be understood by reference to FIGS. 20-24 which represent, respectively five separate processes identified by the initial legend on each flow chart. FIGS. 20 and 21 illustrate the main processing programs by which the system is controlled and monitored as will be described. On closing the power switch S-P, however, the system will systematically go to the initialize process depicted in FIG. 22 of the drawings. In the initialize process, the system is operable only by a supervisory person to whom a key for the lock 46 is provided together with a supervisor data card receivable in the tray 48. This process can be completed only after a frame 204 on the record film 60 is exposed to the supervisory data card and the key 202 withdrawn from the lock 46. Upon completion of the supervisory program, the microprocessor will proceed directly to the main license process illustrated in FIGS. 20A and 20B.

While the respective processes illustrated in FIGS. 20A and 20B, as well as those illustrated in FIGS. 21–24, will be appreciated by those skilled in the microprocessor art, it is to be noted that the respective processes function in parallel to maximize the security of the system. To illustrate this feature, it will be understood from the previous description that operator action to begin an identification card cycle involves first the insertion of a data card into the tray 48 and pushing the tray 48 in to actuate the switch S-2. Once the data card is in place, the highest order of priority, with respect to operative steps, is the recording of the data card on a frame of the record film 60. While the system is operating under the license program to move the mirrors 70 and 102 to a down or data position, for example, the parallel process #2 will be monitoring the tray and will abort the procedure in the event the tray is moved in any way. Similarly, once the procedure has reached the point where the portrait actuating button 50 may be depressed to record a portrait of a subject on the identification card, it is important that no tampering of the back 38 occurs such as movement of the back, withdrawing a film from the back or the like. Hence, any movement or tampering of the back is completely monitored during the critical time when the microprocessor is directing various functions in the performance of the license process.

In addition to the measure of security provided by the parallel processes, it will be noted that a system aborts to an unconditional exit from all processes upon occurrences of malfunctions in any part of the system. On the occurrence of each abort command, a supervisory personnel is required to re-initialize the system.

Figure 25:
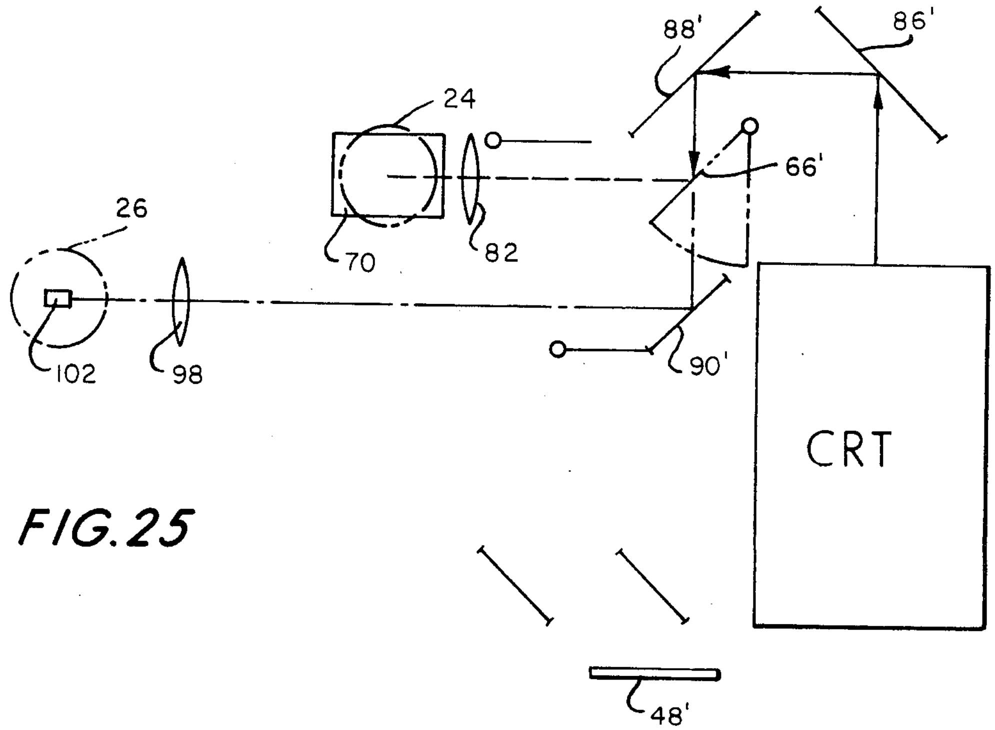
FIG. 25 is a schematic view illustrating optical components of an alternative embodiment of the invention.
Figure 26:
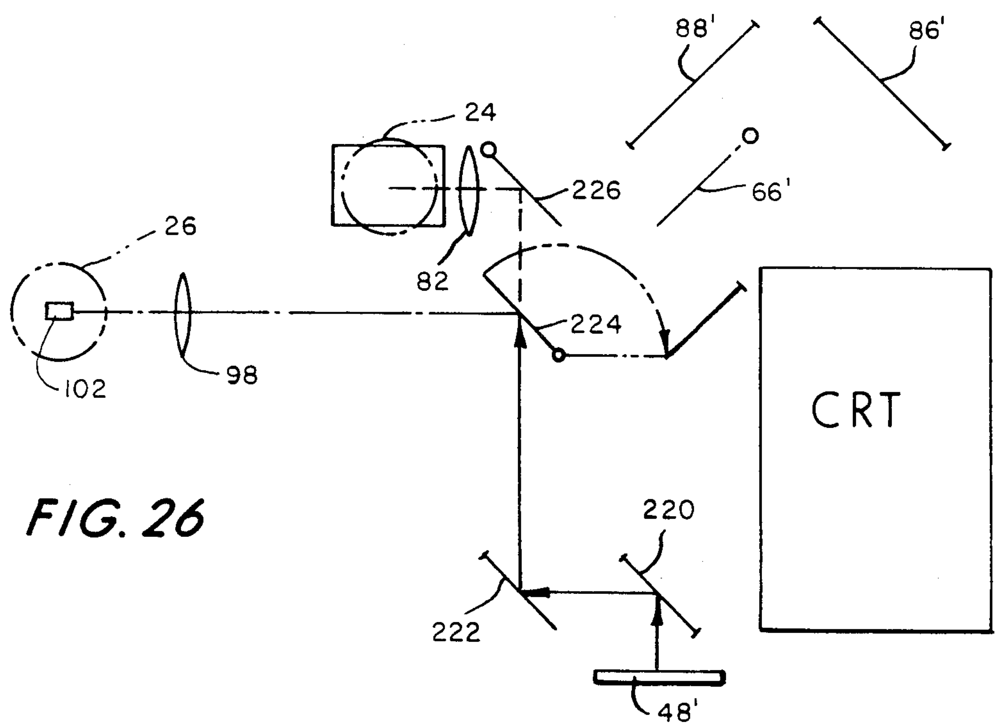
FIG. 26 is a schematic view illustrating the components shown in FIG. 25 but in a different operative condition.

In the alternative embodiment illustrated in FIGS. 25 and 26 of the drawings, an alternative system of optical paths is shown for presenting data to the respective recording and ID film planes with the mirrors 70 and 102 in a down or data position. In this embodiment, a substantial portion of the written information which appears on the identification card is presented by a cathode-ray tube CRT, whereas a data card tray 48' is employed solely for presenting such information as a signature or fingerprint to the respective film planes. Thus, in FIG. 25, the respective paths of light emanating from the CRT to the two film planes are represented again by dashed and dash-dot lines. A pivotal mirror 66' is again employed and is moveable between the two positions illustrated in FIG. 25 to expose, respectively, the ID and record camera film planes.

In FIG. 26, the optical path for presenting the fingerprint and signature supported on the data tray 48' is shown to include a pair of fixed mirrors 220 and 222 and a pair of pivotal mirrors 224 and 226. Thus, the optical path from the card 48' to the mirror 70 of the ID camera requires movement of the mirror 224 to the phantom line position illustrated in FIG. 6 and positioning of a pivotal mirror 226 as shown. An optical path to the mirror 102 of the recording camera is effected by moving the mirror 224 to the inclined solid-line position shown in FIG. 26.

Thus, it will be appreciated that as a result of the present invention, a highly effective identification card system is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. The method of providing a composite identification card having an image of both a subject and data related thereto presented in adjoining relation in a given card format and also providing a record of the subject image and related data, said method comprising:

providing a data carrier for presenting card data relating to a given subject and other data relating thereto in adjoining relation in a given plane and in a format similar to said given card format, but with said other data being presented by said carrier in the area of the carrier format which corresponds to the subject area in said card format;

forming an image of said given subject in photo card material in a given subject area thereof and in photo record material in a first area thereof; and forming an image of only said card data of the carrier presentation in a data area of said card material adjoining said subject area and a full image of said carrier presentation in a second area of said record material whereby said record material includes an image of said subject and an image of both card data and said other data.

2. The method of claim 1, wherein the card data and the other record data are photographically reproduced on one frame of a film record material, and the image of the subject is produced on another frame of the film record.

3. The method of claim 2, wherein said one frame is adjacent said another frame.

4. The method of claim 2, wherein the step of photographically reproducing data on the film record includes presenting said one frame of the film record to an image-receiving portion of a photo record image plane to expose said one frame to an image of the data carrier, and the step of photographically reproducing an image of said subject on said another frame of the film record includes moving said one frame from the image-receiving portion of the photo record image plane and moving said another frame to the image-receiving portion of the photo record image plane to expose said another frame to the image of the subject.

5. The method of claim 1, wherein the steps of photographically reproducing the image of the subject on the identification card material and photographically reproducing the image of the subject on the record material are performed simultaneously.

6. The method of claim 1 wherein said other data comprises a fingerprint of the subject.

7. In a photographic identification apparatus for providing a composite identification card having an image of both a subject and data related thereto presented in adjoining relation in a given card format and also a record of the subject image and related data, said system comprising:

a data carrier for presenting card data relating to a given subject and other data relating thereto in a given plane in adjoining first and second areas thereof in a format similar to said given card format, but with said other data being presented by said carrier in the area of the carrier format which corresponds to the subject area in said card;

an identification card image plane configured for receiving photo card material;

a record image plane configured for receiving a photo record element;

exposing means for directing light from a subject to said card image plane to expose the subject area of photo card material presented thereat and to said record image plane to expose a subject area in the photo record element presented thereat, and for directing light from said first area of said data carrier to said card image plane to expose a data area of said photo card material and from both said first and second areas of said data carrier to said second image plane to expose an image of both said card data and said other data in a data area of said photo record element presented thereat whereby said record element includes an image of said subject and a full image of the data presented by said carrier with said card data and said other data recorded in a record format similar to said card format, but with said other data occupying the area of said record format which corresponds to the subject area of said card.

8. The apparatus recited in claim 7, wherein said means for exposing the data area of said identification card image plane and the data area of said photo record image plane comprise means defining separate light paths between said data carrier and said image planes, respectively.

9. The apparatus recited in claim 8, wherein said means defining separate light paths includes a mirror moveable between an operative position to establish one of said separate light paths and a displaced inoperative position to enable the other of said light paths.

10. The apparatus recited in claim 8, further comprising masking means for blocking passage of light from a portion of the light path between the data carrier and the identification card image plane.

11. The apparatus recited in claim 7 wherein the field of view presented to said identification card image plane during exposure of data is smaller than the field of view presented to said photo record image plane during exposure of data.

12. The apparatus recited in claim 7, wherein the photo record element includes discrete image frames, and the means for exposing the photo record image plane comprises means for presenting one frame of the photo record element to the photo record plane to receive said second data image and for presenting another frame of the photo record element to the photo record plane to receive the light directed from the subject.

13. The apparatus recited in claim 12, wherein said one frame and said another frame are adjacent one another on the photo record element.

14. The apparatus recited in claim 7, wherein the data carrier includes electrically produced data.

15. The apparatus recited in claim 7, wherein the data carrier includes a cathode ray tube.

16. The apparatus of claim 7 wherein said other data comprises a fingerprint of the subject.

17. A photographic identification system for providing composite subject/data identification cards and a photo record corresponding to each such card, comprising:

optical means for directing light from a subject to a subject area of an identification card image plane and to a photo record image plane, and for directing light from a data carrier to a data area of the identification card image plane and to the photo record image plane;

means for presenting a succession of discrete image frames to said photo record image plane;

means for exposing the data area of said identification card image plane to a data image of light directed from said data carrier;

means for exposing said photo record image plane to the data image of light directed from the data carrier;

means for exposing the subject area of said identification card image plane to light directed from a subject;

means for exposing said photo record image plane to light directed from the same subject;

means for presenting a succession of discrete image frames to said photo record image plane, including for each card one image frame to receive said data image of light directed from the data carrier and another data frame to receive the light directed from the subject; and first means for producing on the photo record adjacent the image frames a first blip associated with said one image frame and said another image frame.

18. The apparatus of claim 17, wherein the first blip producing means comprises a stippled area adjacent the data carrier, said stippled area included in the data image of light directed from the data carrier.

19. The method of providing composite subject/data identification cards and a filmstrip record of such cards, said method comprising the steps of:

providing a data carrier for card data and record data applicable to each subject;

photographically reproducing only the card data portion of said carrier on a data area of an identification card;

photographically reproducing both said card data and said record data of said carrier on one frame of the filmstrip record;

photographically reproducing an image of the subject on a subject area of the same identification card;

photographically reproducing an image of the same subject on another frame of the filmstrip record; and producing on the filmstrip record a first blip associated with the data frame and the subject frame of the filmstrip record.

20. The method recited in claim 19, wherein the step of producing the first blip includes producing the first blip along one side of the filmstrip record.

21. The method recited in claim 19, further comprising producing on the filmstrip record a second blip associated with the beginning of a supervisory operational period and a third blip associated with the end of an operational period.

22. The method recited in claim 19, wherein the step of producing the first blip includes producing the first blip along one side of the filmstrip record, and the method further comprises producing along the side of the filmstrip record opposite said one side a second blip associated with the beginning of a supervisory operational period and a third blip associated with the end of the supervisory operational period.

23. The method recited in claim 19, wherein the blip is produced photographically.

* * * * *